(12) United States Patent
Colebrooke

(10) Patent No.: US 12,540,588 B1
(45) Date of Patent: Feb. 3, 2026

(54) PROPULSION MACHINE COMPRISING A SEALING MODULE

(71) Applicant: ROLLS-ROYCE plc, London (GB)

(72) Inventor: Jack F Colebrooke, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 19/267,103

(22) Filed: Jul. 11, 2025

(30) Foreign Application Priority Data

Jul. 31, 2024 (GB) .................................. 2411215

(51) Int. Cl.
*F02K 1/12* (2006.01)
*F02C 7/28* (2006.01)

(52) U.S. Cl.
CPC .............. *F02K 1/1207* (2013.01); *F02C 7/28* (2013.01); *F05D 2220/323* (2013.01)

(58) Field of Classification Search
CPC ............................... F02K 1/1207; F02K 1/805
See application file for complete search history.

(56) References Cited

U.S. PATENT DOCUMENTS

| | | | | |
|---|---|---|---|---|
| 4,575,099 | A * | 3/1986 | Nash ........................ | F02K 1/805 277/345 |
| 5,115,979 | A * | 5/1992 | Ellerhorst ............... | F02K 1/805 239/127.3 |
| 5,288,020 | A * | 2/1994 | Pirker ..................... | F02K 1/805 239/397.5 |
| 6,702,300 | B1 | 3/2004 | Steinetz et al. | |
| 2013/0033005 | A1 | 2/2013 | Treat et al. | |
| 2022/0403798 | A1* | 12/2022 | Shealy .................. | F02K 1/1207 |
| 2022/0412266 | A1 | 12/2022 | Shealy et al. | |
| 2022/0412464 | A1 | 12/2022 | Shealy | |

FOREIGN PATENT DOCUMENTS

| | | |
|---|---|---|
| EP | 2 562 363 A2 | 2/2013 |
| EP | 2 995 802 B1 | 11/2017 |
| GB | 2 265 676 B | 10/1995 |

OTHER PUBLICATIONS

Dec. 4, 2025 Extended European Search Report issued in European Patent Application No. 25189409.3.

\* cited by examiner

*Primary Examiner* — Brian O Peters
(74) *Attorney, Agent, or Firm* — Oliff PLC

(57) ABSTRACT

There is provided a propulsion machine 10 comprising a fluid duct defined by a wall 42, 44 and a moveable member 34, 36 with a sealing module 90, 90' therebetween. The moveable member 34, 36 is moveable relative to the wall 42, 44. The sealing module 90, 90' comprises a mounting structure 92 coupled to the moveable member 34, 36 and an extendable structure 94 having a sealing surface 96. A chamber 98 is defined between the mounting structure 92 and the extendable structure 94 throughout a travel of the extendable structure 94 relative to the mounting structure 92. The sealing module 90, 90' is configured to receive a pressurized actuation fluid into the chamber 98 to load the sealing surface 96 against an opposing surface 43 of the wall 42, 44 to provide a seal with the opposing surface 43.

14 Claims, 13 Drawing Sheets

PROPULSION MACHINE COMPRISING A SEALING MODULE

BACKGROUND

This disclosure claims the benefit of UK Patent Application No. GB 2411215.3 filed on 31 Jul. 2024, which is hereby incorporated herein in its entirety.

CROSS REFERENCE TO RELATED APPLICATIONS

This represents the first application directed towards the subject-matter.

FIELD

This disclosure relates to a propulsion machine comprising a sealing module. This disclosure further relates to an aircraft comprising such a propulsion machine.

BACKGROUND

An exhaust nozzle of a gas turbine engine may include a pair of articulating flaps which enable control of the area of the exhaust nozzle. An escape of core and/or bypass air around the exhaust nozzle as the or each articulating flap moves may be reduced by providing a seal between the flap and a proximal wall of the exhaust nozzle. Escaped core air may leak into an engine bay in which the gas turbine engine is disposed and where temperature sensitive components may be located. Escaped core air is also directly related to thrust losses from the gas turbine engine.

SUMMARY

According to a first aspect there is provided a propulsion machine comprising a fluid duct defined by a wall and a moveable member with a sealing module therebetween, the moveable member being moveable relative to the wall; wherein the sealing module comprises a mounting structure coupled to the moveable member and an extendable structure having a sealing surface; wherein the extendable structure is movable relative to the mounting structure through a travel of the extendable structure, and a chamber is defined therebetween throughout the travel; and wherein the sealing module is configured to receive a pressurized actuation fluid into the chamber to actuate movement of the extendable structure and load the sealing surface against an opposing surface of the wall to provide a seal with the opposing surface throughout the travel.

In an embodiment: the mounting structure has a first interface surface; the extendable structure has a second interface surface; and the first and second interface surfaces cooperate to at least partially close the chamber throughout the travel.

In an embodiment, the first and second interface surfaces cooperate to partially close the chamber by defining a clearance fit therebetween.

In an embodiment, the extendable structure is hingedly mounted to the mounting structure about a pivot axis. In an embodiment, the first and second interface surfaces: cooperate to at least partially close the chamber throughout the travel; and are each concentric about the pivot axis.

In an embodiment, the first interface surface is a first guide surface and the second interface surface is a second guide surface; the mounting structure has a first hinge surface; the extendable structure has a second hinge surface. In an embodiment, the first and second hinge surfaces: cooperate to at least partially close the chamber throughout the travel; are each concentric about the pivot axis; and are disposed radially inward of the first and second guide surfaces with respect to the pivot axis.

In an embodiment, the first and second hinge surfaces cooperate to partially close the chamber by defining a clearance fit therebetween.

In an embodiment, the mounting structure includes an aperture for receiving the actuation fluid into the chamber.

In an embodiment, the extendable structure is resiliently biased away from the mounting structure. In an embodiment, the sealing module comprises a resilient member configured to bias the sealing surface away from the mounting structure.

In an embodiment, the mounting structure or the extendable structure are formed from a material comprising a ceramic. In an embodiment, the mounting structure or the extendable structure are formed from a material comprising a sheet metal.

In an embodiment, the propulsion machine comprises a plurality of sealing modules between the moveable member and the wall. In an embodiment, each sealing module has a configuration as defined in any one of the previous statements above. In an embodiment, the plurality of sealing modules are adjacent one another so that the chambers of the respective sealing modules are in fluid communication with each other. In an embodiment, for each sealing module of the plurality, the respective moveable structure is hingedly mounted to the respective mounting structure at a common pivot axis.

In an embodiment, the propulsion machine is a gas turbine engine.

In an embodiment: the fluid duct is an exhaust gas duct configured to discharge an exhaust flow of gas from a turbine of the gas turbine engine; the wall is a side wall partially defining the exhaust gas duct; and the moveable member is a flap partially defining the exhaust gas passageway.

In an embodiment, the propulsion machine is configured to extract a bleed flow from an upstream location along the propulsion machine. In an embodiment, the flap is configured to direct a portion of the bleed flow to the or each sealing module to provide the actuation fluid for the or each chamber.

According to a second aspect there is provided an aircraft comprising a propulsion machine in accordance with the first aspect.

BRIEF DESCRIPTION OF THE DRAWINGS

Embodiments will now be described by way of example only with reference to the accompanying drawings, in which.

DETAILED DESCRIPTION

Aircraft

Figure 1:
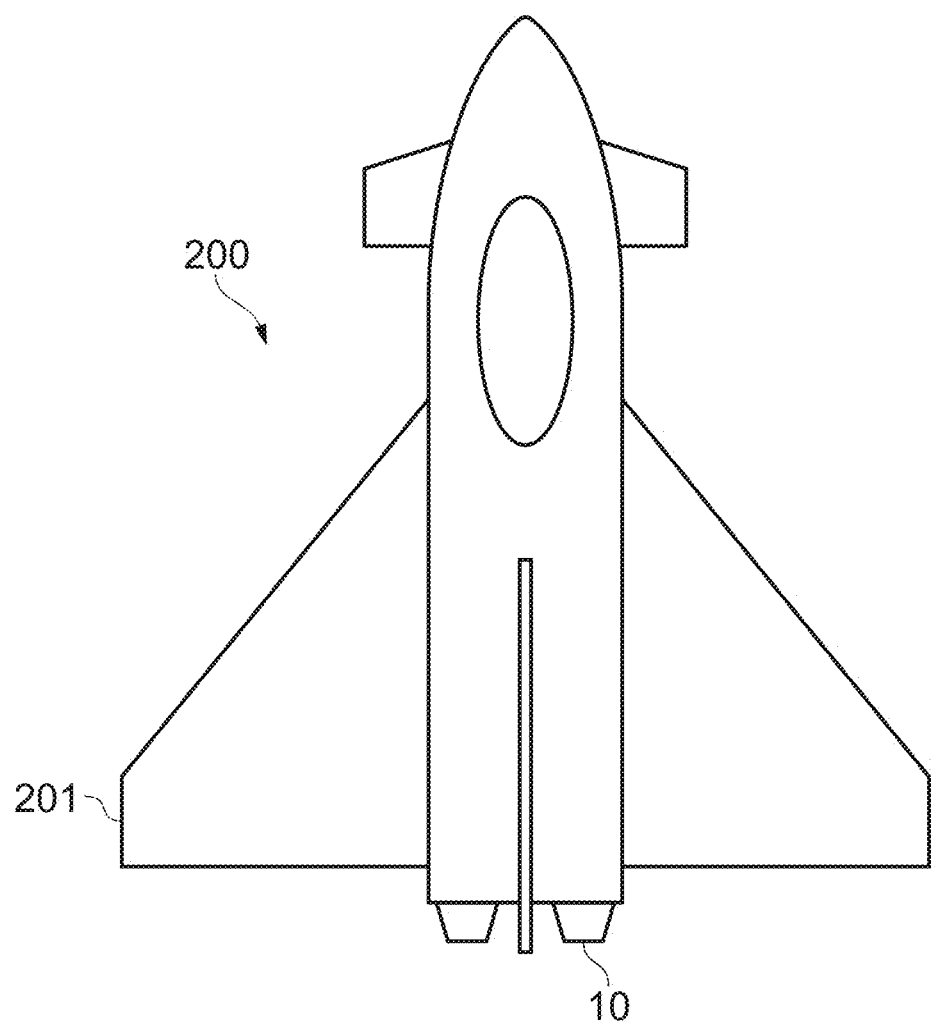
FIG. 1 is a simplified top view of an aircraft comprising an airframe and a propulsion machine.

FIG. 1 shows a simplified and schematic view of an aircraft 200 comprising an airframe 201 and a propulsion machine 10. The propulsion machine 10 may be a gas turbine engine 10 in accordance with the gas turbine engine 10 described below with reference to FIG. 2.

Propulsion Machine

Figure 2:
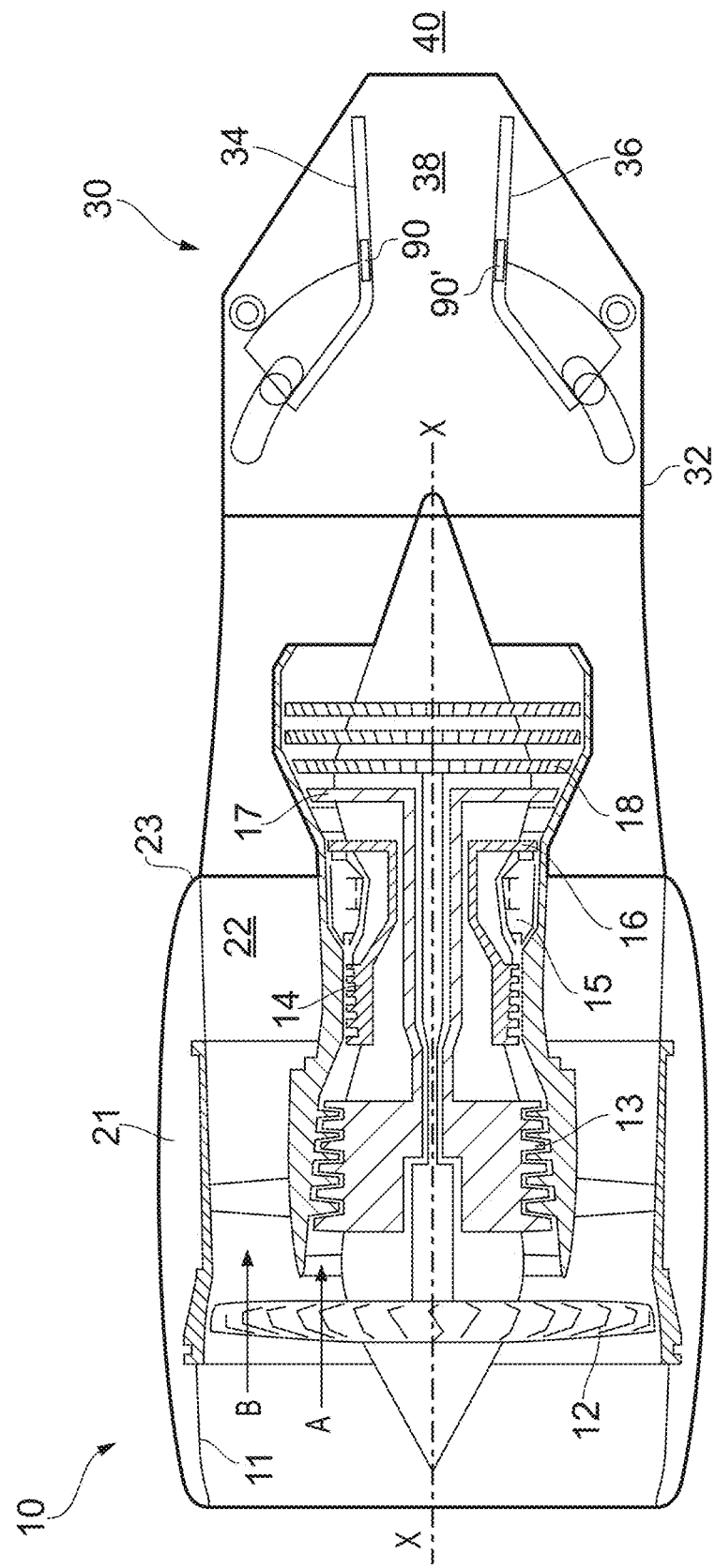
FIG. 2 is a cross-sectional view of an example gas turbine engine and an exhaust nozzle.

FIG. 2 shows a ducted fan gas turbine engine 10 (which is an example of a propulsion machine 10) having a principal and rotational axis X-X. The gas turbine engine 10 is suitable for use with the aircraft 200 described above with FIG. 1. The engine comprises, in axial flow series, an air intake 11, a propulsive fan 12, an intermediate-pressure compressor 13, a high-pressure compressor 14, a combustor 15, a high-pressure turbine 16, an intermediate pressure turbine 17, a low-pressure turbine 18 and a core engine exhaust outlet 19. A nacelle 21 generally surrounds the gas turbine engine 10 and defines the intake 11, a bypass duct 22 and a bypass exhaust outlet 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustor 15 where it is mixed with fuel and the mixture combusted. The resultant hot combustion products then expand through, and thereby drive the high, intermediate and low-pressure turbines 16, 17, 18 before being exhausted through the core engine exhaust outlet 19 to provide additional propulsive thrust. The high, intermediate and low-pressure turbines respectively drive the high and intermediate pressure compressors 14, 13 and the fan 12 by suitable interconnecting shafts.

Exhaust Nozzle

The gas turbine engine 10 further comprises an exhaust nozzle 30. The exhaust nozzle 30 is disposed at a rear end of the gas turbine engine 10 and generally comprises an exhaust structure 32, a first flap 34 (also referred to as a petal) and a second flap 36. The exhaust structure 32 is configured to receive an exhaust flow of gas from the combustor 15 (i.e., the first air flow A after it has passed through the combustor 15). The exhaust duct is further configured to receive the second air flow B after it has passed through the bypass duct 22. The first and second flaps 34, 36 in part define an exhaust gas duct 38 configured to convey the exhaust flow of gas to an exterior 40 of the gas turbine engine 10. Accordingly, the exhaust gas duct 38 functions as a fluid duct configured to discharge the exhaust flow of gas from the turbines 16, 17, 18 and the combustor 15 of the gas turbine engine.

Figure 3:
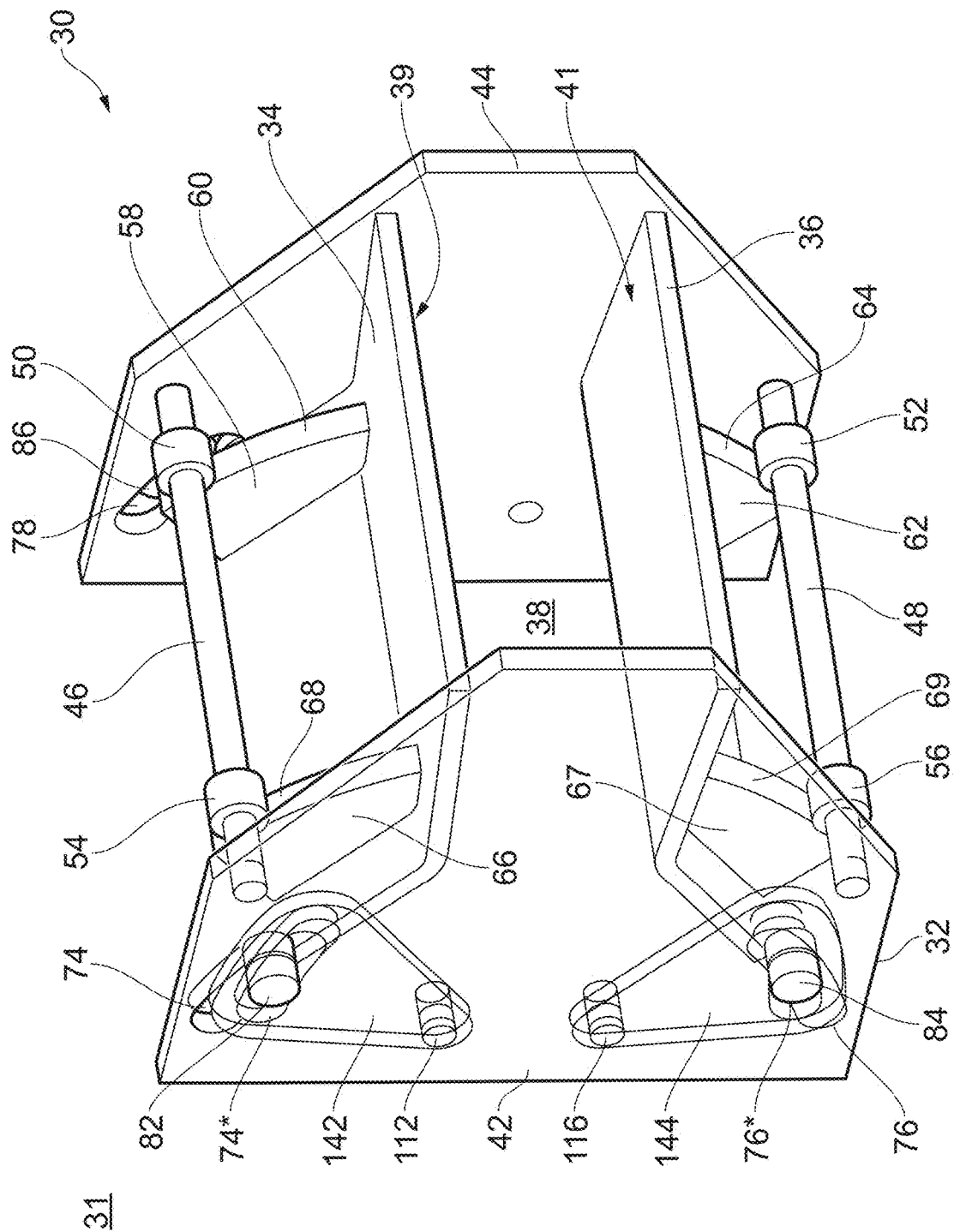
FIG. 3 is a perspective view of an example exhaust nozzle in isolation.

FIG. 3 is a perspective view of an example exhaust nozzle 30 suitable for use as the exhaust nozzle 30 in the gas turbine engine 10 of FIG. 1. As shown, the exhaust structure 32 comprises a first side wall 42 and a second side wall 44 which cooperate with the first and second flaps 34, 36 to define the exhaust gas duct 38 such that the side walls 42, 44 each partially define the exhaust gas duct 38. The first and second side walls 42, 44 are spaced apart from each other. The first flap 34 is disposed between the first and second side walls 42, 44 in an upper portion of the exhaust nozzle 30. The second flap 36 is disposed between the first and second side walls 42, 44 in a lower portion of the exhaust nozzle 30. The first flap 34 comprises a first control surface 39 and the second flap 36 comprises a second control surface 41. The first control surface 39 and the second control surface 41 in part define (along with the first and second side walls 42, 44) the exhaust gas duct 38. In this example the first and second control surfaces 39, 41 are geometrically similar and are reflections of each other, but in other examples may be configured differently to each other. As described in further detail below, each flap 34, 36 is moveable relative to the side walls 42, 44 to change a shape of the exhaust gas duct 38 defined therebetween. Accordingly, the flaps 34, 36 may be referred to as moveable members 34, 36.

The exhaust nozzle is configured to define paths for movement of the flaps 34, 36 relative to the side walls 42, 44. The example discussed below defines cooperating bearing surfaces, rollers and cams, but in other examples movement of the flaps 34, 36 may be guided in other ways.

A first shaft or tiebar 46 extends between the first and second side walls 42, 44 in an upper portion of the exhaust nozzle 30. A second shaft or tiebar 48 extends between the first and second side walls 42, 44 in a lower portion of the exhaust nozzle 30. A first roller 54 is rotatably supported by the first shaft 46 and a second roller 56 is rotatably supported by the second shaft 48. In addition, a third roller 50 is rotatably supported by the first shaft 46 and a fourth roller 52 is rotatably supported by the second shaft 48. The first flap 34 comprises a first cam track or flange 66 that protrudes from the respective control surface to define a first bearing surface 68. The second flap 36 comprises a second cam track or flange 67 that similarly protrudes from the respective control surface to define a second bearing surface 69. The second cam track 67 and second bearing surface 69 are located on the second flap 36 in corresponding positions to the first cam track 66 and first bearing surface 68. The first flap 34 further comprises a third cam track 58 that defines a third bearing surface 60. The second flap 36 further comprises a fourth cam track 62 that defines a fourth bearing surface 64. The fourth cam track 62 and bearing surface 64 are located on the second flap 36 in corresponding positions to the third cam track 58 and third bearing surface 60.

The first side wall 42 comprises a first static slot 74 in an upper portion of the exhaust nozzle 30. The first side wall 42 further comprises a second static slot in a lower portion of the exhaust nozzle 30. The second side wall 44 comprises a third static slot 78 in an upper portion of the exhaust nozzle 30. The second side wall 44 further comprises a fourth static slot in a lower portion of the exhaust nozzle 30 (not shown by FIG. 3). The first flap 34 comprises a first pin 82 that is slidably received by the first static slot 74. The second flap 36 comprises a second pin 84 that is slidably received by the second static slot. The first flap 34 further comprises a third pin 86 that is slidably received by the third static slot 78. The second flap 36 further comprises a fourth pin 88 that is slidably received by the fourth slot 80 (not shown by FIG. 3). Further features of the example exhaust nozzle 30 shown and not shown in FIG. 3 are now described with reference to FIGS. 4 to 7.

Figure 4:
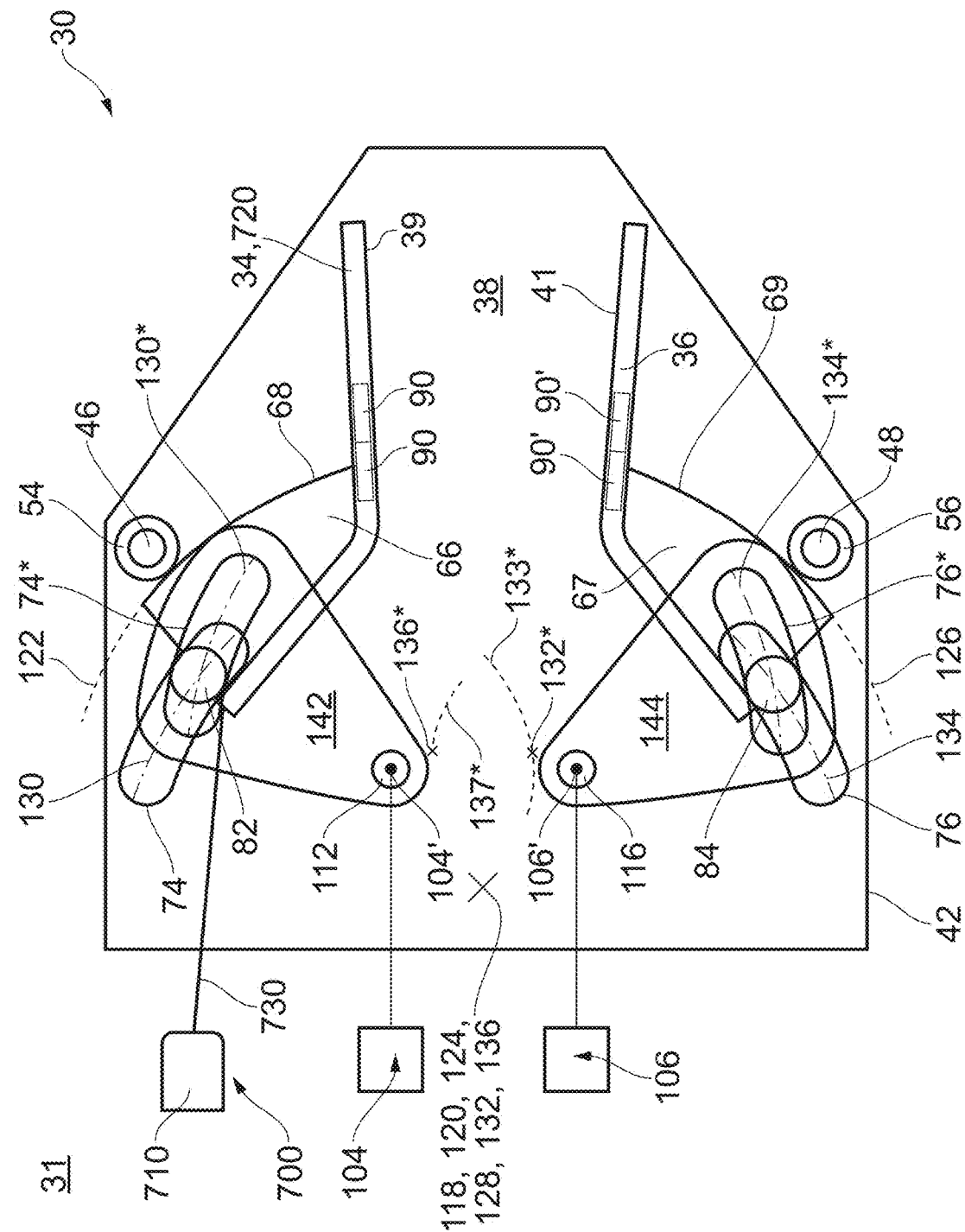
FIG. 4 is a side view of the example exhaust nozzle in a non-vectored dry-thrust configuration.

FIG. 4 is a side view of the example exhaust nozzle 30 shown by FIG. 3 in a non-vectored dry-thrust configuration. The non-vectored dry-thrust configuration of the exhaust nozzle 30 is suitable for use when the engine 10 is operating dry (e.g., without reheat) and vectoring of thrust produced by the engine 10 away from a direction parallel to the rotational axis X-X is not intended. As described in further detail below, the first flap 34 is rotatably coupled to the exhaust structure 32 for rotation about a first axis of rotation 118 and the second flap 36 is rotatably coupled to the exhaust structure 32 for rotation about a second axis of rotation 120 that is coaxial (i.e. aligned) with the first axis of rotation 118. The first and second axes of rotation 118, 120 may be defined so as to give an optimal expansion ratio between the throat and exit of the exhaust nozzle 30.

The first flap 34 comprises a convergent portion and a divergent portion. Accordingly, the first flap 34 is a convergent-divergent flap. Likewise, the second flap 36 comprises a convergent portion and a divergent portion. Accordingly, the second flap 36 is also a convergent-divergent flap. The first and second flaps 34, 36 define a convergent-divergent nozzle, but in other examples may have an alternative configuration that does not define a convergent-divergent nozzle.

Figure 6:
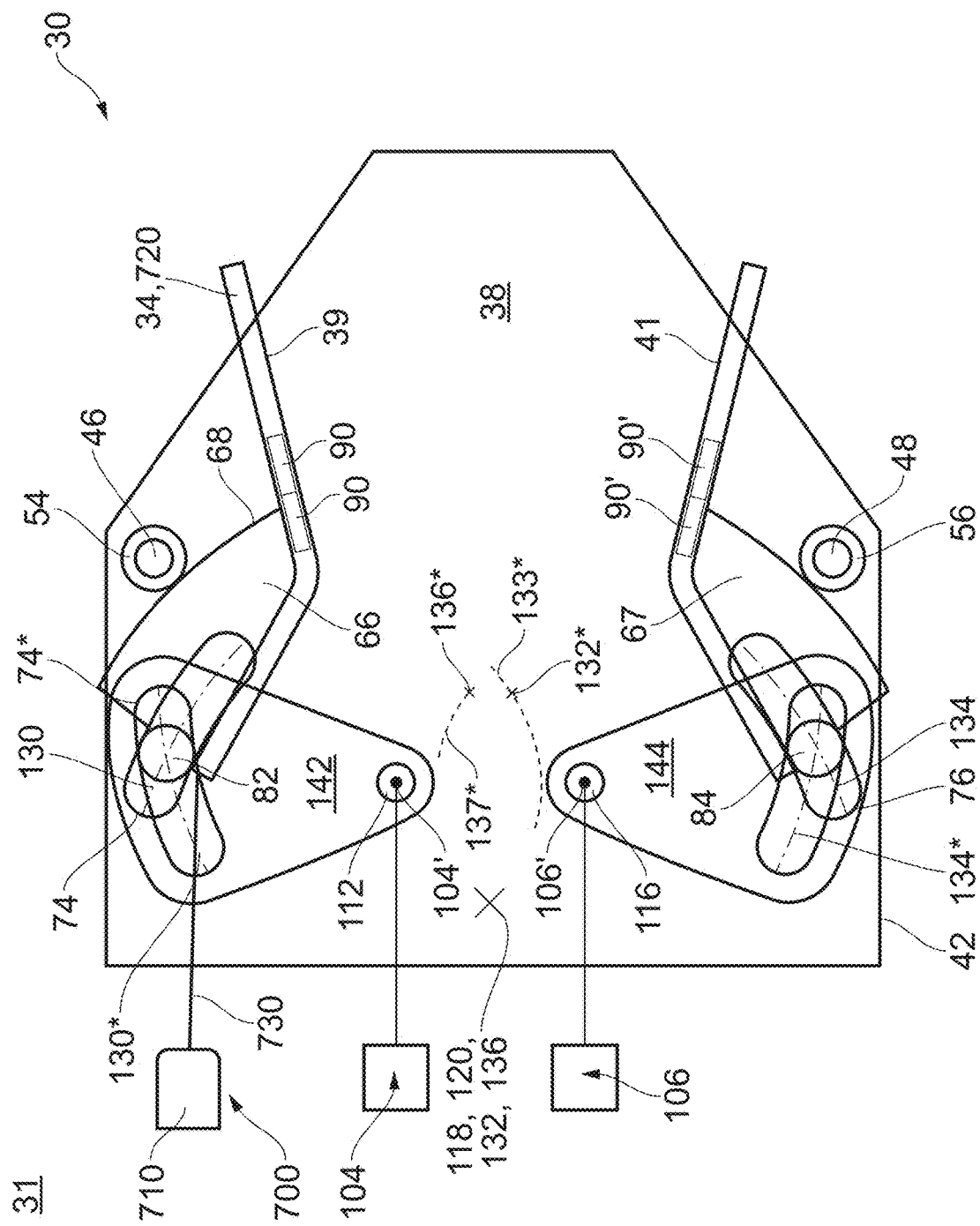
FIG. 6 is a side view of the example exhaust nozzle in a non-vectored wet-thrust configuration.

As shown in FIG. 4, the first bearing surface 68 forms part of a first curved surface 122 having a central axis 124 that is coaxial with the first and second axes of rotation 118, 120. The second bearing surface 69 forms part of a second curved surface 126 having a central axis 128 that is coaxial with the first and second axes of rotation 118, 120. In the example of FIG. 6, each curved surface 122, 126 is a cylindrical surface 122, 126 and the radius of the first cylindrical surface 122 is equal to the radius of the second cylindrical surface 126. Accordingly, the first and second cylindrical surfaces 122, 126 are coincident. A centreline of the first static slot 74 extends at least part way along a first static arc 130 having a centre 132 that is coincident with the first and second axes of rotation 118, 120. A centreline of the second static slot 76 extends at least part way along a second static arc 134 having a centre 136 that is coincident with the first and second axes of rotation 118, 120. Accordingly, the static slots 74, 76 have corresponding curved shapes. The radius of the first static arc 130 is equal to the radius of the second static arc 134. Accordingly, the first and second static arcs 130, 134 lie on a single circle. The first pin 82 and the first roller 54 are circumferentially separated with respect to the first axis of rotation 118. Similarly, the second pin 84 and the second roller 56 are circumferentially separated with respect to the second axis of rotation 120.

The exhaust nozzle 30 comprises a first moveable cam element 142 and a second moveable cam element 144. The first moveable cam element 142 is rotatably coupled to the first wall 42 at a first pivot 112, whereas the second moveable cam element 144 is rotatably coupled to the first wall 42 at a second pivot 116. In other examples, the first and second pivots 112, 116 may not be located in the first wall 42. For instance, the first and second pivots 112, 116 may be located at other fixed positions within the exhaust nozzle 30. The first moveable cam element 142 comprises a first moveable slot 74* which is configured to slidably receive the first pin 82. The first pin 82 extends through both the first static slot 74 and the first moveable slot 74* so as to partially constrain the relative positions of each. Similarly, the second moveable cam element 144 comprises a second moveable slot 76* which is configured to slidably receive the second pin 84. The second pin 84 extends through both the second static slot 76 and the second moveable slot 76* so as to partially constrain the relative positions of each.

A centreline of the first moveable slot 74* extends at least part way along a first moveable arc 130* having a centre 132*. A centreline of the second moveable slot 76* extends at least part way along a second moveable arc 134* having a centre 136*. Accordingly, each moveable slot 74*, 76* has a curved shape. In this example, the radius of the first moveable arc 130* is equal to the radius of the second moveable arc 134*.

The exhaust nozzle 30 also comprises a first actuator 104 and a second actuator 106. The first actuator 104 is generally configured to move the first moveable cam element 142 and thereby cause the first flap 34 to be moved, whereas the second actuator 106 is generally configured to move the second moveable cam element 142 and thereby cause the second flap 36 to be moved. In the example of FIG. 4, the first actuator 104 is a rotary-type actuator (e.g., including an electric motor) and a driving portion 104' of the first actuator 104 is pivotally coupled to the first moveable cam element 142 at the first pivot 112. Likewise, in the example of FIG. 4, the second actuator 106 is a rotary-type actuator (e.g., an including electric motor) and a driving portion 106' of the second actuator 106 is pivotally coupled to the second moveable cam element 144 at the second pivot 116. However, it will be appreciated that other actuator-types are suitable for use as the first actuator 104 and/or the second actuator 106. For instance, the or each actuator 104, 106 may be a linear-type actuator (e.g., including an electromagnetic solenoid or a hydraulic cylinder) and the driving end of the or each actuator may be coupled to the respectively moveable cam element 142, 144 other than at the pivot 112, 116.

During operation of the exhaust nozzle 30 (e.g., to move the flaps 34, 36), the first actuator 104 is able to actuate the first flap 34 about the first axis of rotation 118 through a plurality of first intermediate positions between a first inner position and a first outer position. It will be appreciated that the first inner position need not be the innermost position that the first flap 34 is able to be actuated to and the first outer position need not be the outermost position that the first flap 34 is able to be actuated to. During actuation of the first flap 34, the first pin 82 slides along the first static slot 74 and the first bearing surface 68 bears against the first roller 54. The first roller 54 constrains the motion of the first flap 34 to a predetermined path, such that movement of the first pin 82 along the first static slot 74 causes the first flap 34 to undertake a predetermined compound movement of translation and rotation with one degree of freedom (i.e., so that each position of the first pin 82 along the first static slot 74 corresponds maps to a single respective translational and rotational position of the first flap 34). In the non-vectored dry-thrust configuration shown by FIG. 4, the first flap 34 has been positioned (by means of the first actuator 104 positioning the first moveable cam element 142) at a first intermediate position between the first inner position and the first outer position.

During operation of the exhaust nozzle 30, the second actuator 106 is able to actuate the second flap 36 about the second axis of rotation 120 through a similar plurality of second intermediate positions in the same way.

The first and second flaps 34, 36 can be actuated to the positions shown in FIG. 4 in the non-vectored dry-thrust configuration. Examples of various additional combinations of positions that the first and second flaps 34, 36 can be actuated to in other configurations are described below with reference to FIGS. 5 to 7.

Figure 5:
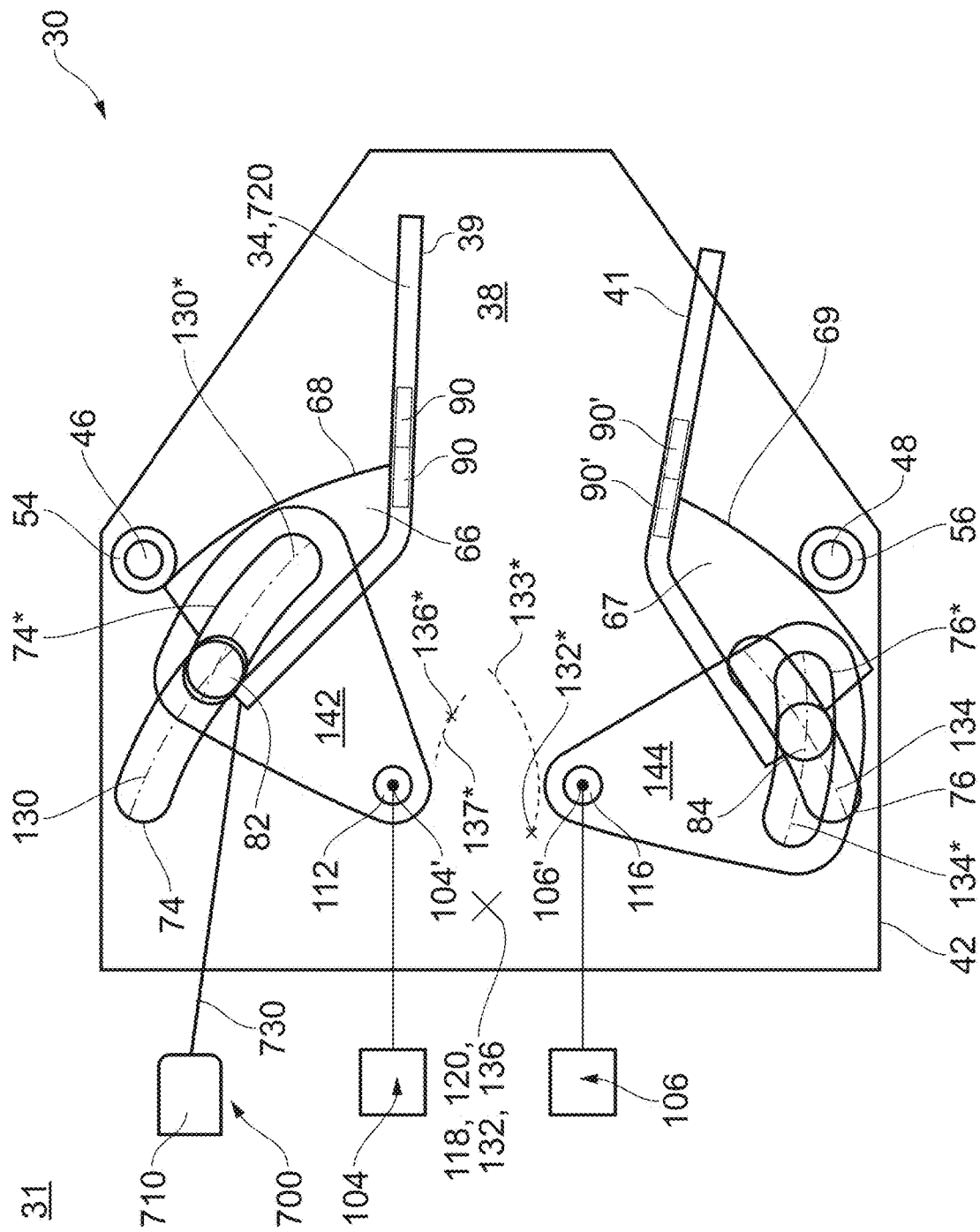
FIG. 5 is a side view of the example exhaust nozzle in a vectored dry-thrust configuration.

FIG. 5 is a side view of the example exhaust nozzle 30 shown by FIG. 3 in a vectored dry-thrust configuration. The vectored dry-thrust configuration of the exhaust nozzle 30 is suitable for use when the engine 10 is operating dry and vectoring of thrust produced by the engine 10 away from a direction parallel to the rotational axis X-X is intended. In the vectored dry-thrust configuration, the first flap 34 has been positioned (by means of the first actuator 104 positioning the first moveable cam element 142) at a first inner position in which the first flap 34 has been rotated approximately 6 degrees closer to the principal rotational axis X-X of the gas turbine engine 10 compared to the first intermediate position shown by FIG. 4; and the second flap 36 has been positioned (by means of the second actuator 106 positioning the first moveable cam element 144) at a second intermediate position in which the second flap 36 has been rotated approximately 6 degrees further from the principal rotational axis X-X of the gas turbine engine 10 compared to the second intermediate position shown by FIG. 4.

FIG. 6 is a side view of the example exhaust nozzle 30 shown by FIG. 3 in a non-vectored wet-thrust configuration. The non-vectored wet-thrust configuration of the exhaust nozzle 30 is suitable for use when the engine 10 is operating wet (e.g., with reheat) and vectoring of thrust produced by the engine 10 away from a direction parallel to the rotational axis X-X is intended. In the non-vectored wet-thrust configuration, the first flap 34 has been positioned (by means of the first actuator 104 positioning the first moveable cam element 142) at a first intermediate position in which the first flap 34 has been positioned relatively far away from the principal rotational axis X-X of the gas turbine engine 10 compared to the first intermediate position of the non-vectored dry-thrust configuration shown by FIG. 4 and the second flap 36 has been positioned (by means of the second actuator 106 positioning the second moveable cam element 144) at a second intermediate position in which the second flap 36 has been positioned relatively far away from the principal rotational axis X-X of the gas turbine engine 10 compared to the second intermediate position of the non-vectored dry-thrust configuration shown by FIG. 4. A minimum cross-sectional area of the exhaust gas duct 38 is therefore greater in the non-vectored wet-thrust configuration shown by FIG. 6 than in the non-vectored dry-thrust configuration shown by FIG. 4.

Figure 7:
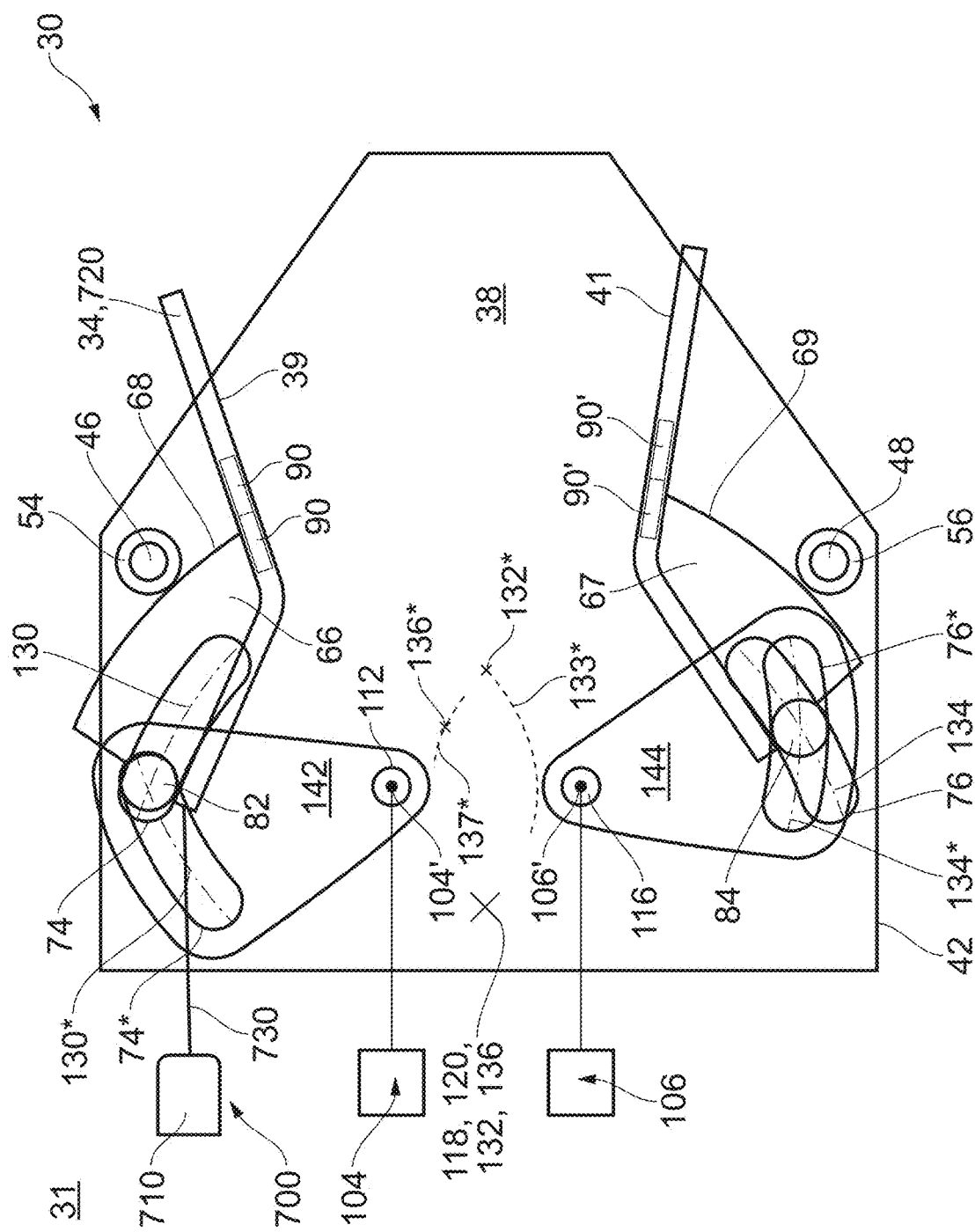
FIG. 7 is a side view of the example exhaust nozzle in a vectored wet-thrust configuration.

FIG. 7 is a side view of the example exhaust nozzle 30 shown by FIG. 3 in a vectored wet-thrust configuration. The vectored dry-thrust configuration of the exhaust nozzle 30 is suitable for use when the engine 10 is operating wet and vectoring of thrust produced by the engine 10 away from a direction parallel to the rotational axis X-X is intended. In the vectored wet-thrust configuration, the first flap 34 has been positioned (by means of the first actuator 104 positioning the first moveable cam element 142) at a first outer position in which the first flap 34 has been rotated approximately 6 degrees further from to the principal rotational axis X-X of the gas turbine engine 10 compared to the first intermediate position shown by FIG. 6 and the second flap 36 has been positioned (by means of the second actuator 106 positioning the first moveable cam element 144) at a second intermediate position in which the second flap 36 has been rotated approximately 6 degrees closer to from the principal rotational axis X-X of the gas turbine engine 10 compared to the second intermediate position shown by FIG. 6.

The position of the centre 132* of the first moveable arc 130* varies between each of the positions shown in FIGS. 4 to 7. In particular, the position of the centre 132* moves along a first trace 133* as the first cam element 142 (and therefore the first movable slot 74*) is moved between the positions shown in each of FIGS. 4 to 7. Throughout the range of first intermediate positions and at both the first inner position and the first outer position of the first flap 34, the centre 132* is offset from the first axis of rotation 118. Similarly, the position of the centre 136* of the second moveable arc 134* varies between each of the positions shown in FIGS. 4 to 6. Namely, the position of the centre 136* moves along a second trace 137* as the second cam element 144 (and therefore the second movable slot 76*) is moved between the positions shown in each of FIGS. 4 to 7. Throughout the range of second intermediate positions and at both the second inner position and the second outer position of the second flap 36, the centre 136* is offset from the second axis of rotation 120.

Also shown, highly schematically, in each of FIGS. 4 to 7 is a ducting system 700 (or, more simply, a system 700). The ducting system comprises a first structure 710 and a conduit 730. The first flap 34 forms a part of the ducting system 700, and the first flap 34 may be referred to as a second structure 720 of the ducting system 700. The first structure 710 is fixed with respect to, and may form a part of, the first side wall 42. Consequently, the second structure 720, 34 is movable (and, in use, moves) with respect to the first structure 710 as shown by FIGS. 3 to 6. For this reason, the ducting system 700 may be referred to as an articulatable (or articulating) ducting system 700.

The ducting system 700 is generally configured to convey a fluid (e.g., a gas comprising air) from the first structure 710 to the second structure 720, 34 via the conduit 730 for the purpose of, by way of example, cooling the second structure 720, 34 and in particular for cooling the control surface 39 of the first flap 34. The first control surface 39 of the first flap 34 is, in use, exposed to the exhaust flow of gas conveyed through the exhaust gas passageway 38. As a result, the first control surface 39 may also be referred to as a first gas-washed surface 39. The fluid may be, in particular, a fluid received (directly or indirectly) into the first structure 710 from another part of the gas turbine engine 10, such as gas from a section of the core upstream of the combustor 15 (e.g., the compressor(s) 13, 14) or from the bypass duct 22 (e.g., from the propulsive fan 12), which would generally be of a lower temperature than gas received from the core in the exhaust gas passageway. Namely, the gas turbine engine 10 may be configured to extract a bleed flow from a location upstream of the exhaust nozzle 30 and the ducting system 700 may be configured to convey the bleed flow from the first structure 710 to the second structure 720, 34. Once conveyed into the second structure 720, 34, the fluid (e.g., the gas) may flow through one or more apertures provided in the first gas-washed surface 39 into a region of the exhaust gas passageway 38 proximal to the first gas-washed surface 39. As a result, a boundary region of relatively cool gas between the exhaust gas passageway 38 and the first flap 34 is generated. This reduces a rate of heat transfer into the exhaust flaps, thereby limiting and/or reducing a temperature of the first flap 34 (and, in particular, of the first control surface 39) during operation of the gas turbine engine 10. The boundary region may provide film or effusion cooling.

Sealing Module

An example sealing module 90, 90' suitable for use with the exhaust nozzle 30 described above will now be described. As will be apparent from the following description, the example sealing module 90, 90' is configured to be mounted to a moveable member (such as a flap 34, 36 as described above) and to provide a seal between the moveable member and a wall (such as the side walls 42, 44 as described above). As such, the disclosure envisages sealing modules, including the example sealing module, being suitable for application to the example exhaust nozzle 30 described above, or being suitable for application to other fluid ducts defined by a wall and a moveable member.

It will be appreciated that the characteristics of the seal provided by the sealing module 90, 90' is atypical because, in use, the flap 34, 36 moves in a direction which is generally perpendicular to a line along which the seal acts (e.g., the sealing line). The sliding speed between the articulating flap 34, 36 and the proximal wall 42, 44 is also complex to categorise because it is both static and dynamic.

The example sealing module further comprises a plurality of sealing modules 90, 90' for providing a seal between the first and second side walls 42, 44 and the respective flaps 34, 36 as the latter are moved in use. As shown by each of FIGS. 4 to 7, first sealing modules 90 are fixed to (e.g., mechanically coupled to) the first flap 34 proximal to the first side wall 42 while second sealing modules 90' are fixed (e.g., mechanically coupled to) to the second flap 36 proximal to the first side wall 42. Each sealing module 90, 90' of the exhaust nozzle 30 is disposed at least partially between a respective flap 34, 36 and a respective side wall 42, 44.

Figure 8:
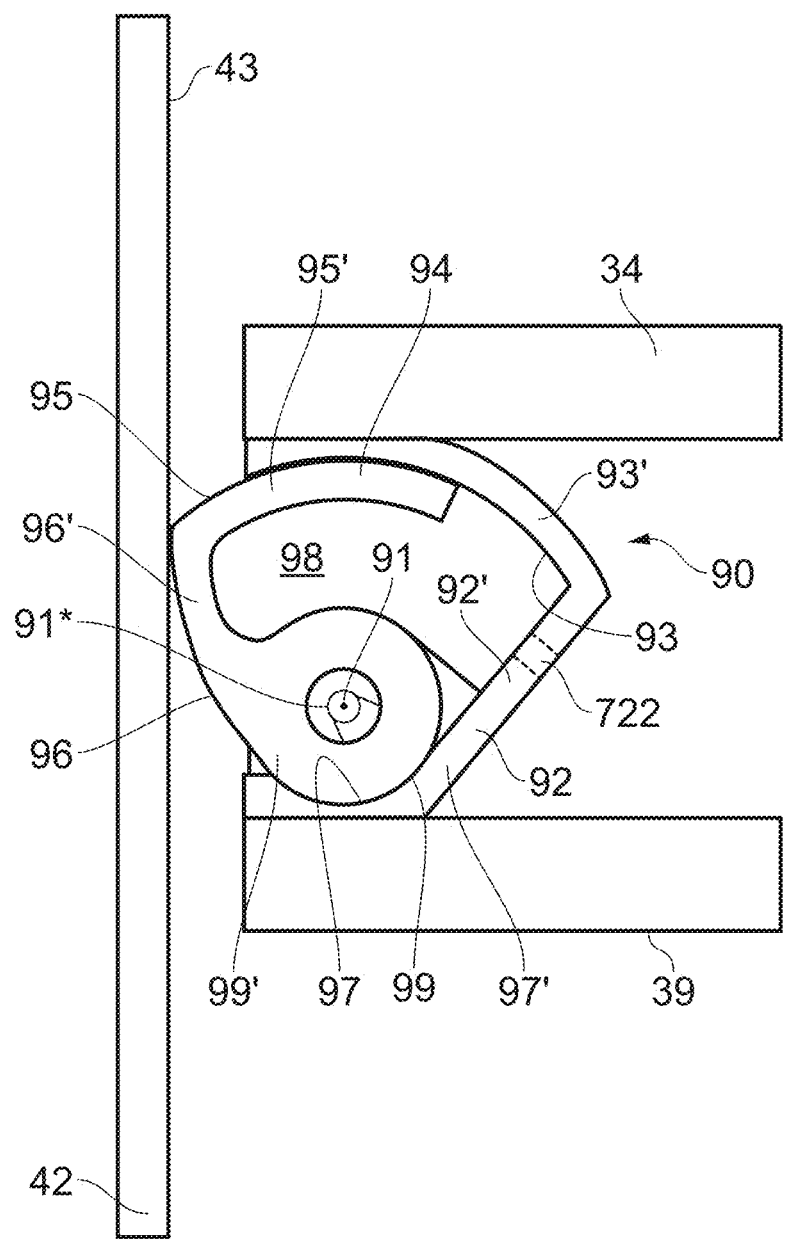
FIG. 8 is a cross-sectional view of a first example sealing module in an extended position, the first example sealing module being located within an exhaust nozzle.
Figure 9:
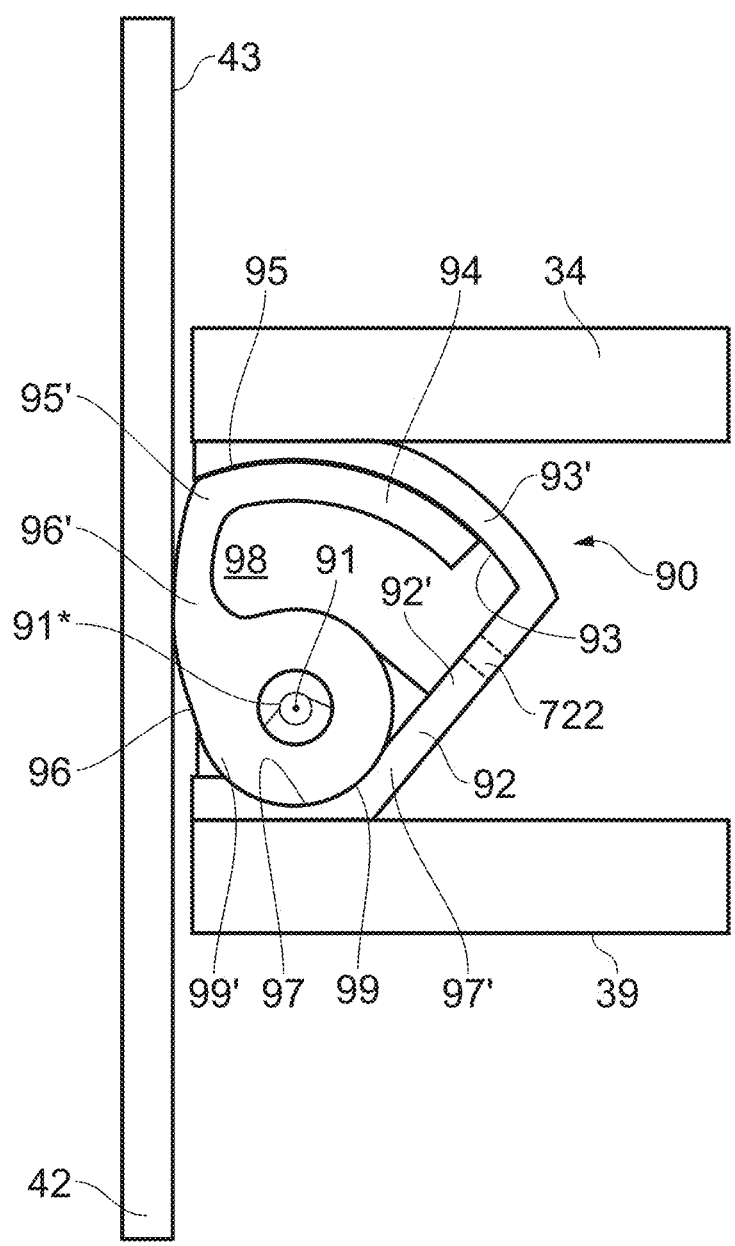
FIG. 9 is a cross-sectional view of the first example sealing module in a retracted position, the first example sealing module being located within an exhaust nozzle.
Figure 10:
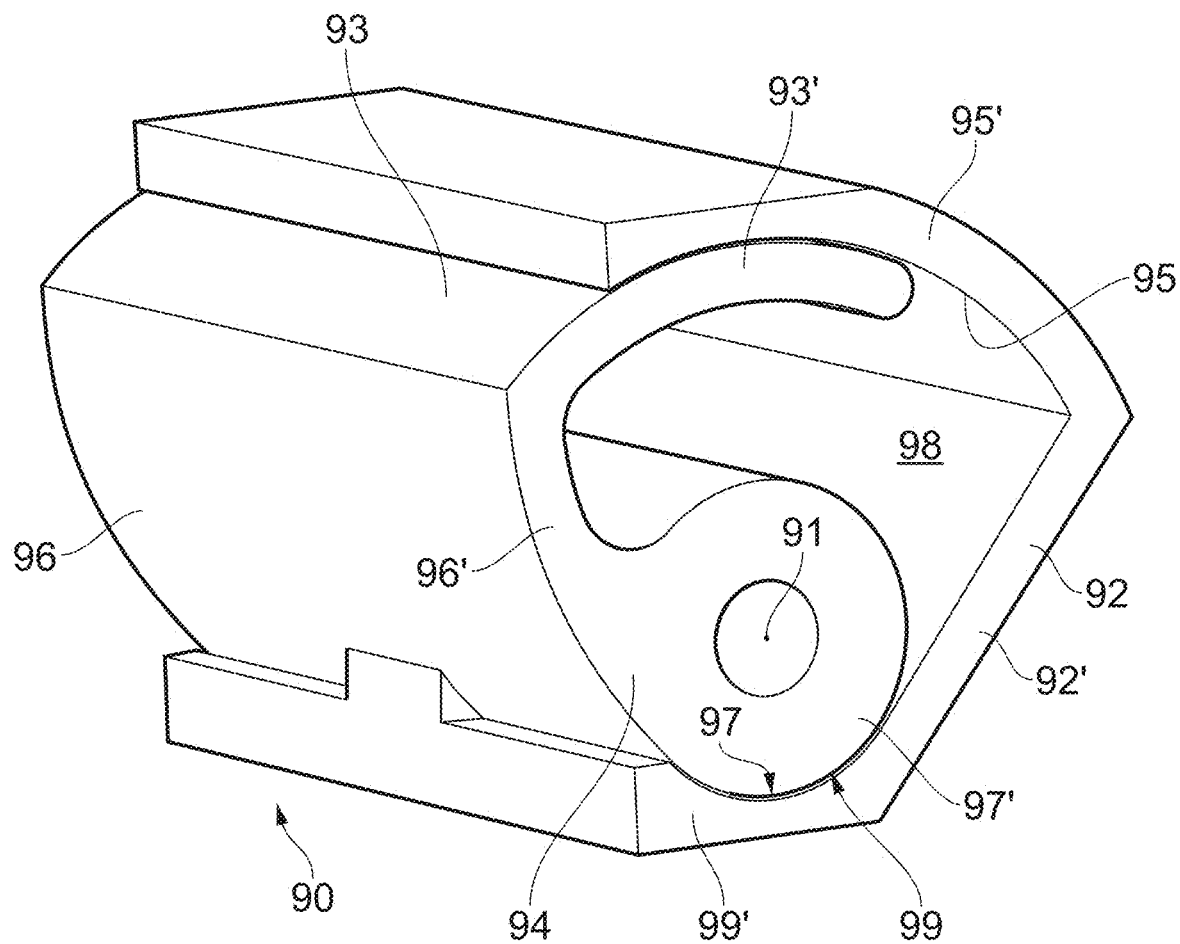
FIG. 10 is a perspective view of the first example sealing module.

FIGS. 8 and 9 are cross-sectional views of a first example sealing module 90 suitable for use within the exhaust nozzle 30 of FIGS. 3 to 7. In FIG. 8, the first example sealing module 90 is shown in situ within an exhaust nozzle 30 as described above with reference to FIGS. 3 to 7 in an extended position. In FIG. 9, the first example sealing module 90 is shown in situ within the exhaust nozzle 30 in a retracted position. FIG. 10 is an isolated perspective view of the first example sealing module 90 in the extended position.

The first example sealing module 90 includes a mounting structure 92 disposed within, and fixed to (e.g., mechanically coupled to), the first flap 34, and an extendable structure 94 having a sealing surface 96. The extendable structure 94 is hingedly mounted to the mounting structure 92 about a pivot axis 91. Accordingly, the extendable structure 94 is movable relative to the mounting structure 92 throughout a rotational travel of the extendable structure 94 about the pivot axis 91 between the extended position shown by FIG. 8 and the retracted position shown by FIG. 9. A chamber 98 is defined between the mounting structure 92 and the extendable structure 94 throughout the rotational travel.

The mounting structure 92 has a first guide surface 93 and a first hinge surface 97. Correspondingly, the extendable structure 94 has a second guide surface 95 and a second hinge surface 99. The first and second hinge surfaces 97, 99 are disposed radially inward of the first and second guide surfaces 93, 95 with respect to the pivot axis 91 (e.g., first and second hinge surfaces 97, 99 are relatively proximal to the pivot axis 91 compared to the first and second guide surfaces 93, 95). Further, the first guide surface 93 is radially outward of the second guide surface 95 with respect to the pivot axis 91 and the first hinge surface 97 is radially outward of the second hinge surface 99 with respect to the pivot axis 91. The surfaces 93, 95, 97, 99 are each curved (e.g., arcuate) surfaces, with the guide surfaces 93, 95 being complementary surfaces and the hinge surfaces 97, 99 also being complementary surfaces.

More specifically, the first guide surface 93 is defined by an arcuate arm portion 93' of the mounting structure 92 which extends partially around the extendable structure 94 while the second guide surface 95 is defined by a complementary arcuate arm portion 95' of the extendable structure 94 which extends partially within the arcuate arm portion 93' of the mounting structure 92. The first hinge surface 97 is defined by a joint portion 97' of the mounting structure 92 and the second hinge surface 99 is defined by a complementary joint portion 99' of the extendable structure 94. The arcuate arm portion 93' is separated from the joint portion 97' of the mounting structure 92 by a connecting portion 92' thereof, whereas the arcuate arm portion 95' is separated from the joint portion 99' of the extendable structure 94 by a connecting portion 96' thereof. The connecting portion 96' also defines the sealing surface 96.

The first and second guide surfaces 93, 95 cooperate to at least partially close the chamber 98 throughout the rotational travel by defining a clearance fit therebetween. Likewise, first and second hinge surfaces 97, 99 cooperate to at least partially close the chamber 98 throughout the rotational travel by defining a clearance fit therebetween. The guide surfaces 93, 95 and the hinge surfaces 97, 99 may each be more generally referred to as interface surfaces 93, 95, 97, 99 (e.g., first and second interface surfaces, as appropriate). Each interface surface 93, 95, 97, 99 is concentric about the pivot axis 91 to facilitate movement of the mounting structure 92 and the extendable structure 94 throughout the rotational travel between the positions shown by FIGS. 8 and 9.

The first example sealing module 90 is configured to received a fluid into the chamber 98. Receipt of the fluid at a pressure which is greater than an ambient pressure around extendable structure 94 causes rotational movement of the external structure 94 relative to the mounting structure 92 around the pivot axis 91 towards the first side wall 42 of the exhaust nozzle 30, and thus loading of the sealing surface 96 against an opposing surface 43 of the side wall 42 throughout the rotational travel. The fluid which the first example sealing module 90 is configured to receive into the chamber 98 for this purpose may be referred to as a pressurized actuation fluid. The loading of the sealing surface 96 against the opposing surface 43 as caused by the receipt of the pressurized actuation fluid results in the provision of a seal between the sealing surface 96 and the opposing surface 43. In other words, receipt of the pressurized actuation fluid energizes or actuates the sealing module 90 and promotes formation and maintenance of the seal between the sealing surface 96 and the opposing surface 43, with the extension of the extendable structure accommodating a variable distance between the flap 34 and the side wall 42 in use. FIGS. 8 and 9 show an example aperture 722 positioned within the mounting structure 92 through which the pressurized actuation fluid may be received into the chamber 98 from an adjacent plenum within the flap 34. It will be appreciated that in other examples an aperture may be suitably positioned to receive pressurized actuation fluid depending on a particular ducting system in the component to which the sealing module 90 is mounted.

In general, the sealing module 90 and the gas turbine engine 10 as a whole (e.g., the ducting system 700) may be configured to ensure that a balance between a pressure of the pressurized actuation fluid and the ambient pressure around extendable structure 94 (e.g., the pressure of the gas conveyed by the exhaust gas duct 38) is provided which enables effective sealing of the flap 34, 36 against the adjacent side wall 42, 44, while reducing (e.g., minimizing) drag between the sealing surface 96 and the opposing surface 43. This may be achieved by appropriate sizing of components and/or by active control of supply of pressurized actuation fluid into the chamber 98.

The sealing surface 96 is shaped to give a shallow approach angle with respect to the opposing surface 43 throughout the travel of the expandable structure 94. This facilitates the seal provided by the sealing module 90 sliding in multiple directions as the flap 34 is moved.

The clearance fits between the hinge surfaces 97, 99 and the guide surfaces 93, 95 form respective gaps for allowing the pressurized actuation fluid to leave the chamber 98. The movement of the pressurized actuation fluid through the gap(s) defined between the respective interface surfaces 93, 95, 97, 99 promotes cooling of the sealing module 90. Namely, the pressurized actuation fluid may be received at a significantly lower temperature than a bulk temperature of the gas conveyed by the exhaust gas duct 38 (especially if the pressurized actuation fluid corresponds to a bleed flow of air extracted from the bypass duct 22 of the gas turbine engine 10). Therefore, movement of the pressurized actuation fluid through the gap(s) defined between the respective interface surfaces 93, 95, 97, 99 and subsequently washing over of the nearby surfaces of the sealing module 90 provides cooling thereto. In particular, the gap between the hinge surfaces 93, 95 enables pressurized actuation fluid to wash over the sealing surface 96 and thus provides a buffer zone of cooling air over the sealing surface, providing a film or effusion cooling effect, or comparable effect. Further, if the extendable structure 94 were to suffer a structural failure which resulted in the loss of the sealing surface 96, the buffer zone of cooling air which originates from the gap between the interface surfaces 93, 95, 97, 99 floods the surrounding area, thereby mitigating an impact of hot gases escaping from the exhaust gas duct 38 around the respective flap. The gap between the interfacing surfaces 93, 95, 97, 99 may be selected so that a target amount of pressurized actuation fluid may leave the chamber 98 per unit time to provide an appropriate amount of cooling to the sealing module 90.

The pressurized actuation fluid may correspond to at least a portion of the bleed flow extracted from the location upstream of the exhaust nozzle 30 as supplied by the ducting system 700 which includes the flap 34 as part of the second structure 720. The bleed flow may be extracted from a section of the core or the bypass duct 22 of the gas turbine engine 10.

The clearance fit between the first and second guide surfaces 93, 95 and/or the clearance fit between the first and second hinge surfaces 97, 99 may be a close clearance fit in operation (e.g., a H8/f7 ISO 286-1 hole-basis fit or a ISO 286-1 F8/h7 shaft-basis fit in operation). That is, the first and second guide surfaces 93, 95 and/or the first and second hinge surfaces 97, 99 are configured so that they do not cooperate to provide an interference fit therebetween.

The function of the sealing module 90 is not fundamentally reliant on compliance (e.g., resilient deformation) of the materials from which it is formed to provide the seal with the opposing surface 43. Accordingly, the sealing module 90 may be formed from a wider range of materials, including ceramics. The mounting structure 92 and/or the extendable structure 94 may be formed from a material comprising a ceramic. The use of materials comprising a ceramic for the mounting structure 92 and/or the extendable structure 94 is advantageous in terms of expected wear, sliding friction between the flaps 34, 36 and the side walls 42, 44, as well as a maximum operating temperature of the sealing module 90. In addition, by implementing materials and a configuration which does not rely on material compliance (e.g. resilient deformation) for operation reduces a likelihood that the materials from which the sealing module 90 is formed will suffer from cracking, and so sealing modules 90 in accordance with the present disclosure are associated with increased robustness.

The sealing module 90 may comprise a rotational spring 91* (e.g., resilient member 91*) which is configured to resiliently bias the extendable structure 94 away from the mounting structure 92 and towards the opposing surface 43 (i.e. towards the extended position). The resilient biasing of the extendable structure 94 enables preloading of the sealing surface 96 against the opposing surface 43 during transient conditions (e.g., during a start-up procedure of the gas-turbine engine) in which the supply of pressurized actuation fluid may not be relied upon for loading the sealing surface 96 against the opposing surface 43. In some examples, the extendable structure may be resiliently biased to the extended position (e.g. by a rotational spring or other type of spring), and there may be no means for pressurized actuation such as the aperture 722 or associated ducting system.

Figure 11:
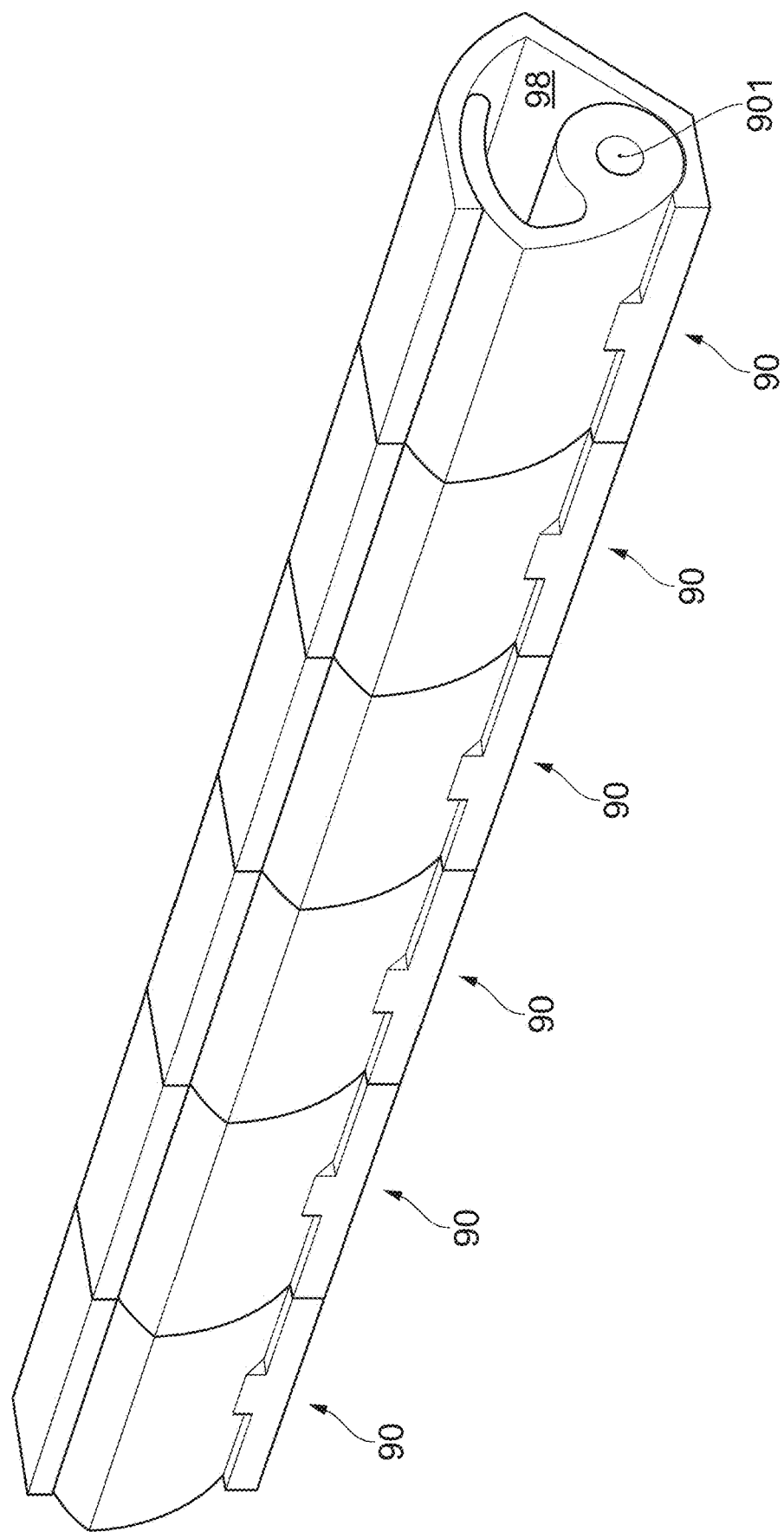
FIG. 11 is a perspective view of a plurality of first example sealing modules.

FIG. 11 is an isolated perspective view of a plurality of sealing modules 90. Each sealing module 90 is in accordance with the first example sealing module 90 described above with reference to FIGS. 8 to 10. In FIG. 11, each of the plurality of sealing modules 90 is in the extended position as in FIGS. 8 and 10. The plurality of sealing modules 90 are adjacent to one another and aligned with one another such that the chambers 98 of the respective sealing modules 90 are in fluid communication with each other. More specifically, the pivot axes 91 of each of the sealing modules are aligned with one another and thereby form a common pivot axis 901.

The positioning of the plurality of sealing modules 90 in this way results in the formation of a sealing arrangement which is split into segments, with each segment corresponding to (e.g. provided by) a respective sealing module 90. Compared to a relatively elongate sealing arrangement, such a sealing arrangement is better able to withstand thermal distortion in use and allows for a variable distance between the sealing arrangement and the opposing surface 43 along the length of the sealing arrangement to be better accommodated. In addition, failure of one of the sealing modules 90 does not necessarily lead to complete failure of the sealing arrangement as whole (e.g., a single point failure of the entire sealing arrangement is avoided), thereby promoting improved reliability of the exhaust nozzle 30 in which the sealing arrangement is incorporated.

Figure 12:
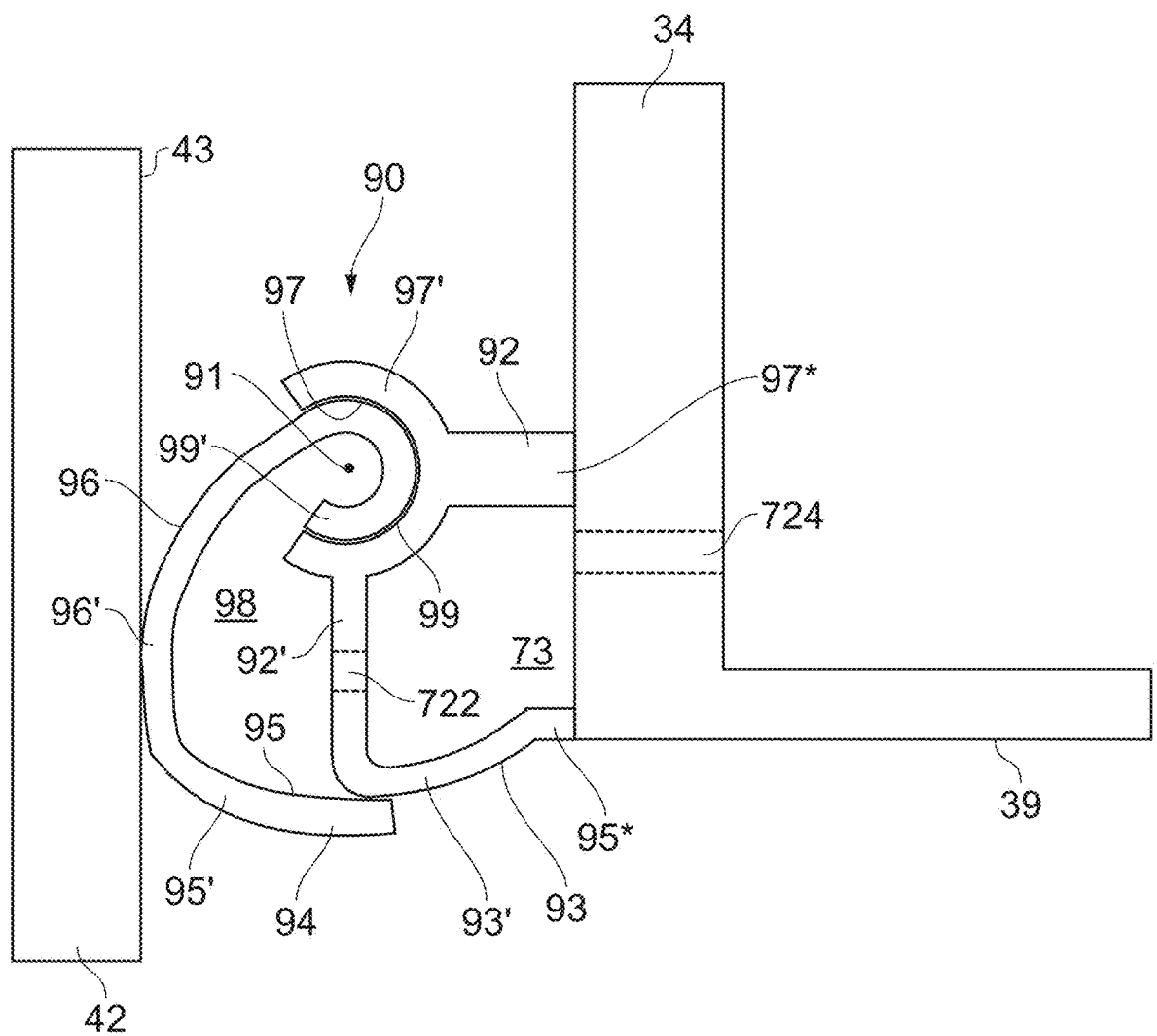
FIG. 12 is a cross-sectional view of a second example sealing module in an extended position, the second example sealing module being located within an exhaust nozzle.
Figure 13:
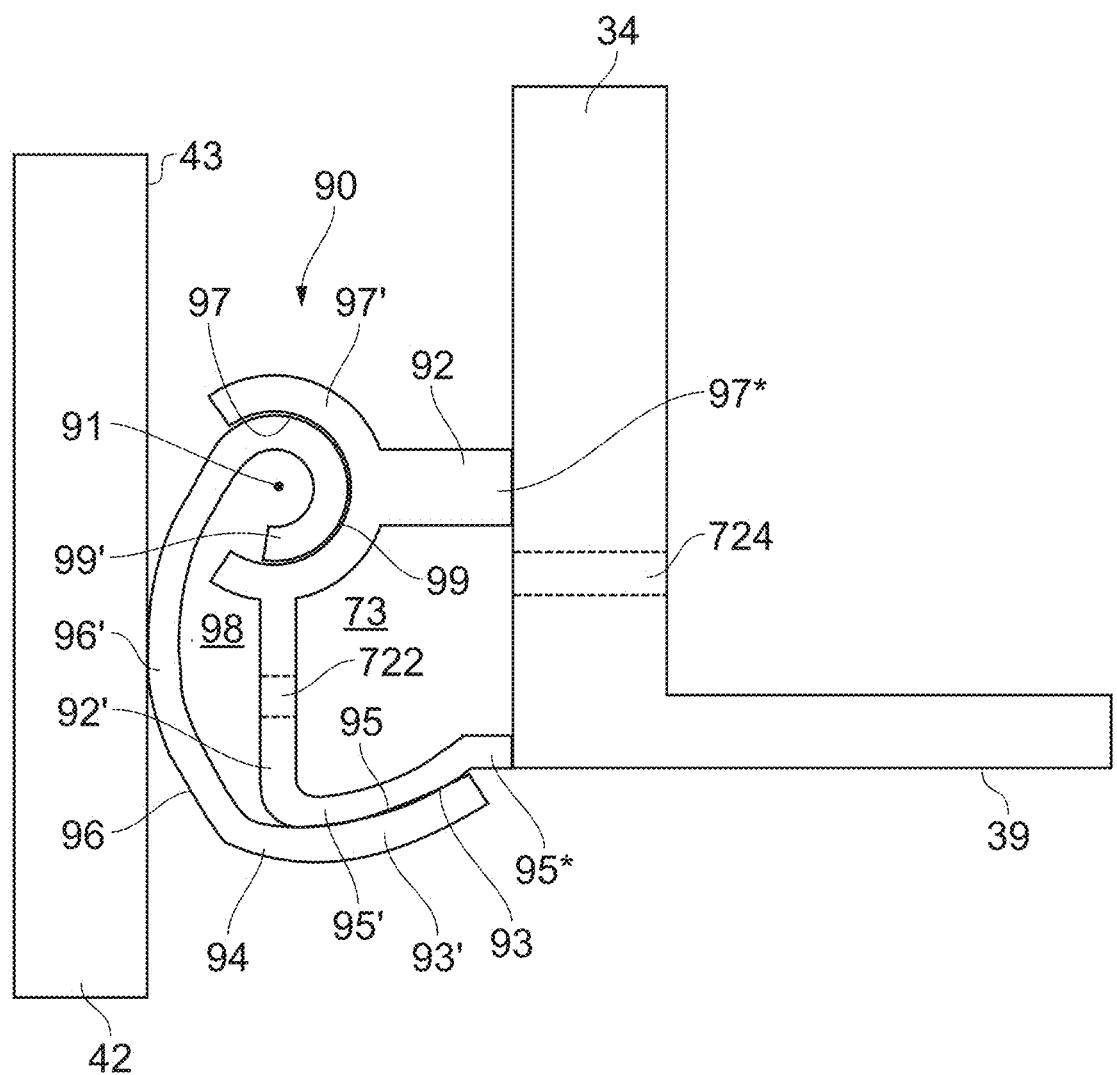
FIG. 13 is a cross-sectional view of the second example sealing module in a retracted position, the second example sealing module being located within an exhaust nozzle.

FIGS. 12 and 13 are cross-sectional views of a second example sealing module 90 suitable for use within the exhaust nozzle 30 of FIGS. 3 to 7. In FIG. 12, the second example sealing module 90 is shown in situ within an exhaust nozzle 30 as described above with reference to FIGS. 3 to 7 in an extended position. In FIG. 13, the second example sealing module 90 is shown in situ within the exhaust nozzle 30 in a retracted position. The second example sealing module 90 is generally similar to the first sealing module 90 described above with reference to FIGS. 8 to 10, with like reference signs denoting common or similar features. The differences between the first example sealing module 90 and the second example sealing module 90 will become clear in light of the following description.

As shown by FIGS. 12 and 13, the mounting structure 92 of the second example sealing module 90 is fixed (e.g., mechanically coupled) to, but is not disposed within, the first flap 34. That is, the mounting structure 92 is located between the first flap 34 and the side wall 42. The mounting structure 94 also cooperates with the flap 34 to define a cavity 73 through which the pressurized actuation fluid passes before being received into the chamber 98 through the aperture 722. As a result, the cavity is formed between the mounting structure 92 and the flap 34. An additional aperture 724 fluidically connects the cavity 73 and the flap 34 to enable the pressurized actuation fluid to be supplied from the flap 34 to the chamber 98 (e.g., to enable the portion of the bleed flow extracted from the gas turbine engine 10 corresponding to the pressurized actuation fluid to be supplied from the flap 34 to the chamber 98).

In contrast to the first sealing module 90 described above with reference to FIGS. 8 to 10, the second guide surface 95 is radially outward of the first guide surface 93 with respect to the pivot axis 91. Accordingly, the arcuate arm portion 95' of the extendable structure 94 extends partially around the mounting structure 92 while the complementary arcuate arm portion 93' of the mounting structure 92 extends partially within the arcuate arm portion 95' of the extendable structure 94. The mounting structure 92 further comprises a first attachment portion 97* which indirectly connects the hinge portion 97' to the first flap 34 and a second attachment portion 95* which indirectly connects the arcuate arm portion 95' to the first flap 34. It is, however, anticipated that either or both of the attachment portions 95*, 97* may be omitted and the hinge portion 97 and the arcuate arm portion 95' of the mounting structure may be directly connected to the first flap 34.

Like in the first sealing module 90 described above with reference to FIGS. 8 to 10, each interface surface 93, 95, 97, 99 is concentric about the pivot axis 91 to facilitate movement of the mounting structure 92 and the extendable structure 94 throughout the rotational travel between the positions shown by FIGS. 12 and 13. Additionally, like in the first sealing module 90 described above with reference to FIGS. 8 to 10, the first hinge surface 97 is radially outward of the second hinge surface 99 with respect to the pivot axis 91.

The configuration of the second example sealing module 90 (e.g., the second guide surface 95 being radially outward of the first guide surface 93) is particularly suitable for the formation of the mounting structure 92 and the extendable structure 94 from metal materials. For example, the mounting structure 92 and/or the extendable structure 92 of the second example sealing module 90 may be formed from a material comprising a sheet metal. The use of such materials may reduce a mass of the sealing module 90 and/or enable easier manufacturing of the sealing module 90 (which is associated with lower costs thereof).

Sealing modules 90, 90' in accordance with the present disclosure provide an effective, low-maintenance and compact solution for preventing the escape of air from an exhaust nozzle having one or more articulatable flaps over a variable distance between said articulate flap(s) and a proximal wall of the exhaust nozzle in a relatively high-temperature environment. Sealing modules 90, 90' in accordance with the present disclosure may have a relatively larger mass than conventional sealing arrangements. However, in many technical applications (e.g., in aerospace), compactness may be more technically important than seal mass because surrounding casings can also be reduced in size if the sealing arrangement is relatively smaller, thus offsetting a relatively higher mass of the sealing arrangement in the context of the exhaust nozzle 30 as a whole.

Although it has been described that the extendable structure 94 is hingedly mounted to the mounting structure 92, this need not necessarily be the case. By way of example, the extendable structure 94 may be slidably mounted to the mounting structure 92 such that the extendable structure 92 is movable relative to the mounting structure 92 throughout a translational travel of the extendable structure 94 between an extended position shown by and a retracted position. Other Various examples have been described, each of which comprise one or more combinations of features. It will be appreciated by those skilled in the art that, except where clearly mutually exclusive, any of the features may be employed separately or in combination with any other features and the invention extends to and includes all combinations and sub-combinations of one or more features described herein. The present disclosure is also relevant for land, aviation and marine applications in both civil and military contexts.

The invention claimed is:

1. A propulsion machine comprising:
a fluid duct defined by a wall and a moveable member with a sealing module therebetween, the moveable member being moveable relative to the wall, wherein:
the sealing module comprises a mounting structure coupled to the moveable member and an extendable structure having a sealing surface;
the extendable structure is movable relative to the mounting structure through a travel of the extendable structure, and a chamber is defined therebetween throughout the travel;
the extendable structure is hingedly mounted to the mounting structure about a pivot axis; and
the sealing module is configured to receive a pressurized actuation fluid into the chamber to actuate movement of the extendable structure about the pivot axis and load the sealing surface against an opposing surface of the wall to provide a seal with the opposing surface throughout the travel.

2. The propulsion machine of claim 1, wherein:
the mounting structure has a first interface surface;
the extendable structure has a second interface surface; and
the first and second interface surfaces cooperate to at least partially close the chamber throughout the travel.

3. The propulsion machine of claim 2, wherein the first and second interface surfaces cooperate to partially close the chamber by defining a clearance fit therebetween.

4. The propulsion machine of claim 2, the first and second interface surfaces: cooperate to at least partially close the chamber throughout the travel; and are each concentric about the pivot axis.

5. The propulsion machine of claim 4, wherein:
the first interface surface is a first guide surface and the second interface surface is a second guide surface;
the mounting structure has a first hinge surface;
the extendable structure has a second hinge surface; and
the first and second hinge surfaces:
 cooperate to at least partially close the chamber throughout the travel;
 are each concentric about the pivot axis; and
 are disposed radially inward of the first and second guide surfaces with respect to the pivot axis.

6. The propulsion machine of claim 1, wherein the mounting structure includes an aperture for receiving the actuation fluid into the chamber.

7. The propulsion machine of claim 1, wherein the extendable structure is resiliently biased away from the mounting structure.

8. The propulsion machine of claim 1, comprising a plurality of sealing modules between the moveable member and the wall.

9. The propulsion machine of claim 8, wherein the plurality of sealing modules are adjacent one another so that the chambers of the respective sealing modules are in fluid communication with each other.

10. The propulsion machine of claim 8, wherein for each sealing module of the plurality of sealing modules, the respective moveable structure is hingedly mounted to the respective mounting structure at a common pivot axis.

11. The propulsion machine of claim 1, wherein the propulsion machine is a gas turbine engine.

12. The propulsion machine of claim 11, wherein:
   the fluid duct is an exhaust gas duct configured to discharge an exhaust flow of gas from a turbine of the gas turbine engine;
   the wall is a side wall partially defining the exhaust gas duct; and
   the moveable member is a flap partially defining an exhaust gas passageway.

13. The propulsion machine of claim 12, configured to extract a bleed flow from an upstream location along the propulsion machine,
   wherein the flap is configured to direct a portion of the bleed flow to the sealing module to provide the actuation fluid for the chamber.

14. An aircraft comprising the propulsion machine of claim 1.

* * * * *